United States Patent Office 2,758,925
Patented Aug. 14, 1956

2,758,925

PROCESSING OF MILK PRODUCTS

Jens Peter Jensen, Copenhagen, Denmark

No Drawing. Application March 31, 1953,
Serial No. 346,034

17 Claims. (Cl. 99—20)

This invention relates to milk products and has for its object the provision of an improved process for the manufacture of milk products, and particularly cheese, casein, butter, dried milk, and condensed milk. In accordance with the process of the invention, a composition comprising glycerol and either an acid or a base is added to the milk product at a suitable stage in its preparation. The invention also contemplates the inclusion in the composition, especially when the composition contains an acid, of small amounts of hydrogen peroxide.

The compositions may be added directly to the milk or to the product in some stage in its preparation in relatively very small amounts. The compositions apparently do not effect any appreciable quantitative alteration of the product, and, although the invention is not predicated on any theory as to the action of the composition, it appears that the composition initiates, through physiochemical action, certain qualitative changes in constituents of the milk or the product. The compositions appear to act by raising the oxidation level and influencing the action of the anaerobic bacteria.

The proportions of glycerol to acid or base are not especially critical and the respective amounts may be arranged in any suitable proportions to give the desired results. The following examples illustrate the approximate proportions, by weight, of the components of compositions which give especially effective results in the processing of milk products according to the invention:

*Example 1*

73% glycerol
27% N-hydrochloric acid

*Example 2*

73% glycerol
27% solid NaOH

*Example 3*

32% glycerol
12% N-hydrochloric acid
56% 30% $H_2O_2$

*Example 4*

90% glycerol
10% solid KOH

*Example 5*

85% glycerol
15% solid $Na_2CO_3$

*Example 6*

77% glycerol
8% solid boric acid
15% 1/10 N-hydrochloric acid

The aforementioned compositions of Examples 1, 2, 4, 5 and 6 may be used in the process of the invention by incorporating approximately 5 g. in the material undergoing processing on a basis of 100 kg. of milk, while from 12–15 g. of the composition of Example 3 may be used on the basis of 100 kg. of milk.

The words "acids" and "bases," as used herein and in the claims, refer to inorganic acids and bases which, of course, are not toxic and the bases are preferably alkali metal bases.

When using compositions comprising an acid, it is frequently desirable, especially when making cheese, to include hydrogen peroxide in the compositions because this makes it possible to lessen the water binding properties of the cheese or casein. The hydrogen peroxide raises the oxidation level which can be important in processes where there is a risk of butyric acid fermentation, as in the manufacture of cheese. Suitable compositions for this purpose are illustrated by Example 3. However, when producing cheese, from 12 to 15 g. of the composition of the Example 3 are used but on the basis of 100 kg. of cheese.

The following is an example of employing the process of the invention in the manufacture of butter:

700 kg. of cream containing 30% of fat was acidified by bacteriological means, and on completion of the acidification, was divided into two batches of 350 kg. each. To one batch was added immediately before churning 100 g. of a composition according to Example 2 dissolved in 900 g. of a concentrated solution of common salt. Both batches were churned, and the butter that resulted from the batch to which the composition had been added had a pH of 5.1, and proved to be capable of keeping for up to 3 months. The control butter had a pH of 4.7 and would keep for only 3 weeks before turning oily and rancid. Actually, the butter manufactured according to the invention was materially better after three months than was the control butter after three weeks.

In the manufacture of dried milk effective results are obtained by adding to 5000 liters of milk, before conveying it to the evaporators, 100 g. of a composition according to Example 2, dissolved in 1 liter of water. The resulting dried milk is characterized by being more easily soluble, having better keeping quality, having a less pronounced boiled flavor, and by having more "body" than dried milk manufactured without admixture of the composition.

In the manufacture of condensed milk, the same procedure may be employed as in the manufacture of dried milk.

When the composition is employed for the manufacture of butter and cheese, it is desirable that it be added together with water-soluble coloring matter, if such is employed in any case.

The following table illustrates the application of the composition and its action in the manufacture of cheese. Tests 1, 4 and 7 were controls containing no composition of glycerol and an acid or base. In test 2, there was added together with rennet 5 g. of a composition according to Example 2 dissolved in 15 g. of a concentrated solution of common salt. In tests 5 and 8, there was added together with the rennet 5 g. of a composition according to Example 4. In tests 3, 6 and 9, 5 g. of a composition according to Example 1 dissolved in 15 g. of a concentrated solution of common salt was added together with the rennet.

| Cheese | Tests | Pasteurization temperature of milk, °C | Mixture Percent fat | Mixture Percent acid or lithe | Used for each 100 kg. Nitre, g. | Salt, g. | Coloring, g. | Rennet, g. | Curdling Temperature, °C | Curdling Time in min. | Prestirring in min. | Drawing-off of whey, in minutes | After-heating, in minutes | After-heating, temp., °C | Total time of stirring, in minutes | Time of pressing or kneading, in min. | Time of pressing, in hours | Time in brine Days | Time in brine Temperature, °C | Remarks |
|---|---|---|---|---|---|---|---|---|---|---|---|---|---|---|---|---|---|---|---|---|
| 45% kneaded Gouda. | 1 | 72 | 2.8 | 1 | 10 | 150 | 5 | 40 | 31.5 | 30 | 35 | 5 | 20 | 39 | 105 | 10 | 3 | 3 | 10 | Dry—a little too open, a tendency to too much fermentation. |
|  | 2 | 72 | 2.8 | 1 | 10 | 150 | 5 | 30 | 31.5 | 30 | 35 | 5 | 20 | 39 | 90 | 10 | 3 | 3 | 10 | 100% fine consistency. Cheese first rate in every respect. |
|  | 3 | 58-60 | 2.8 | 1 | 10 | 150 | 5 | 30 | 31.5 | 30 | 35 | 5 | 20 | 39 | 85 | 10 | 3 | 3 | 10 | 100% fine consistency. |
|  | 4 | 72 | 2.9 | 0.7 | 20 | ---- | ---- | 40 | 31.0 | 30 | 45 | 5 | 20 | 40 | 120 | 30 | 4 | 4 | ---- | Small-piped, a tendency to split, impure flavor. |
| 45% Samose | 5 | 72 | 2.9 | 0.7 | 20 | ---- | 20 | 32 | 31.0 | 30 | 45 | 5 | 20 | 40 | 100 | 30 | 4 | 4 | 10 | 100% fine consistency. |
|  | 6 | 72 | 2.9 | 0.7 | 20 | ---- | 20 | 32 | 31.0 | 30 | 45 | 5 | 20 | 40 | 105 | 30 | 4 | 4 | 10 | 100% fine consistency. Cheese first rate in every respect. |
| 45% Swedish "Manor" type. | 7 | 70 | 2.85 | 0.6 | 20 | ---- | ---- | 30 | 30.0 | 35 | 40 | 5 | 35 | 43 | 175 | 30 | 20 | 3 | 10 | Large-holed—dry. |
|  | 8 | 70 | 2.85 | 0.6 | 20 | ---- | 20 | 30 | 30.0 | 30 | 40 | 5 | 35 | 43 | 130 | 30 | 20 | 3 | 10 | 100% fine consistency. |
|  | 9 | 70 | 2.85 | 0.6 | 20 | ---- | 20 | 30 | 30.0 | 30 | 40 | 5 | 35 | 43 | 140 | 30 | 20 | 3 | 10 | Do. |

I claim:

1. A process for the manufacture of a milk product of the group consisting of cheese, butter, casein, dried milk, and condensed milk which comprises incorporating in the product during its manufacture a significant amount of a composition containing glycerol and a substance of the group consisting of an acid and a base in which the amount of glycerol is in excess of the amount of said acid or base.

2. A process as claimed in claim 1 in which the composition is added to the milk from which said product is made.

3. A process as claimed in claim 1 for the manufacture of a product of the group consisting of cheese and casein in which the composition is added together with rennet.

4. A process as claimed in claim 1 for the manufacture of casein in which the composition is added together with an acid for curdling the milk.

5. A process as claimed in claim 1 for the manufacture of a product of the group consisting of cheese and casein in which the composition contains glycerol, an acid, and hydrogen peroxide.

6. A process as claimed in claim 1 for the manufacture of processed cheese in which the composition is incorporated in the product at the time of carrying out the processing and contains glycerol, hydrochloric acid, and hydrogen peroxide.

7. A process as claimed in claim 1 in which the composition is added in an amount less than 1% based on the amount of the milk product employed.

8. A process for the curdling of milk which comprises admixing with rennet a significant amount of a composition containing glycerol and a substance of the group consisting of an acid and a base in which the amount of glycerol is in excess of the amount of the acid or base, and adding the mixture to the milk.

9. A process as claimed in claim 1 in which the composition is added in a concentrated solution of common salt.

10. A process as claimed in claim 1 for the manufacture of butter and cheese in which the composition is added together with water-soluble coloring matter.

11. A composition for use in the manufacture of milk products comprising a mixture of glycerol and a compound of the group consisting of an acid and a base in which the amount of glycerol is in excess of the amount of the acid or base.

12. A composition according to claim 11 which comprises hydrogen peroxide and an acid.

13. A composition according to claim 11 in which the acid is hydrochloric acid and the base is the base of an alkali metal.

14. A process for the manufacture of a milk product of the group consisting of cheese, butter, casein, dried milk and condensed milk which comprises incorporating in the product during its manufacture a significant amount of a composition containing, as essential constituents, from 32% to 90% of glycerol and from 8% to 27% of a substance of the group consisting of an acid and a base.

15. The process as claimed in claim 14 in which the composition is added in an amount less than 1% based on the amount of the milk product.

16. A process for the curdling of milk which comprises mixing with rennet a significant amount of a composition containing, as essential constituents, from 32% to 90% of glycerol and from 8% to 27% of a substance of the group consisting of an acid and a base, and adding the mixture to the milk.

17. A composition for use in the manufacture of milk products comprising, as essential constituents, a mixture of from 32% to 90% of glycerol and from 8% to 27% of a substance of the group consisting of an acid and a base.

References Cited in the file of this patent

UNITED STATES PATENTS

| 1,897,892 | Draisbach | Feb. 14, 1933 |
| 1,925,093 | Frederiksen | Sept. 5, 1933 |
| 2,148,544 | Doering et al. | Feb. 28, 1939 |
| 2,163,778 | Draisbach | June 27, 1939 |
| 2,596,753 | Winger | May 13, 1952 |

FOREIGN PATENTS

| 1,405 | Great Britain | Nov. 24, 1894 |

OTHER REFERENCES

Liquor Hydrogenii Dioxidi, in "The Dispensatory of the United States of America," twenty-first edition. Copyright, 1926, by H. C. Wood, Jr., published by J. P. Lippincott Co., Philadelphia, Pa., page 641.

Elixir of Pepsin and Rennet, in "The National Formulary," pages 134, 135, seventh edition, 1942, published by the Amer. Pharmaceutical Assoc., Wash., D. C.